United States Patent
Oechsner et al.

(10) Patent No.: US 6,622,101 B1
(45) Date of Patent: Sep. 16, 2003

(54) QUALITY SURVEILLANCE OF A PRODUCTION PROCESS

(75) Inventors: Richard Oechsner, Nuremberg (DE); Thomas Tschaftary, Fuerth (DE); Poitr Strzyzewski, Herzogenrath (DE); Lothar Pfitzner, Erlangen (DE); Claus Schneider, Bubenreuth (DE); Peter Hennig, Vieselbach (DE)

(73) Assignees: Fraunhofer-Gesellschaft zur Foerderung der Angewandten Forschung e.V., Munich (DE); X-Fab Semiconductor Foundries AG., Erfurt (DE)

( * ) Notice: Subject to any disclaimer, the term of this patent is extended or adjusted under 35 U.S.C. 154(b) by 0 days.

(21) Appl. No.: 09/868,922

(22) PCT Filed: Jan. 17, 2000

(86) PCT No.: PCT/DE00/00144

§ 371 (c)(1),
(2), (4) Date: Jan. 22, 2002

(87) PCT Pub. No.: WO00/42480

PCT Pub. Date: Jul. 20, 2000

(30) Foreign Application Priority Data

Jan. 15, 1999 (DE) .......................... 199 01 410
Jan. 17, 1999 (DE) .......................... 199 01 486
Jan. 25, 1999 (DE) .......................... 199 02 795

(51) Int. Cl.$^7$ ............................................... G06F 19/00
(52) U.S. Cl. .................... 702/84; 702/181; 702/182; 702/184
(58) Field of Search ........................ 702/79, 80, 81, 702/84, 181, 182, 184, 179; 700/33, 44, 109, 110, 108; 438/9

(56) References Cited

U.S. PATENT DOCUMENTS

| 4,679,137 A | 7/1987 | Lane et al. .................... 700/83 |
| 4,805,089 A | 2/1989 | Lane et al. .................... 702/123 |

(List continued on next page.)

FOREIGN PATENT DOCUMENTS

| GB | 2303720 | 2/1997 |
| GB | 2309800 | 8/1997 |
| WO | 95/24673 | 9/1995 |
| WO | 98/18066 | 4/1998 |

*Primary Examiner*—Kamini Shah
(74) *Attorney, Agent, or Firm*—Greenblum & Bernstein, P.L.C.

(57) ABSTRACT

Method for monitoring a quality of a plurality of particularly different technical product types which are produced in a quasi-parallel manufacturing process, the manufacturing method including several sequentially arranged manufacturing stations, and whereby a course of a state variable for at least one of the manufacturing stations is determined point-by-point and displayed, the method including determining as a first type number a number of product types to be monitored, determining technical product parameter which is affected in the at least one manufacturing station, allocating a measuring arrangement to the manufacturing station for measuring the technical product parameter for at least one of the monitored product types, taking a random sample of a product type whose physical state is modified in the manufacturing station, the random sample being taken the first type number of product types, determining measured values for the determined technical product parameter of the random sample, calculating an individual average value from the measured values, storing the individual average value in a multi-dimensional average value attributed to the first type number, and repeating the taking through the storing for at least one further product type to supplement at least one further measured average value to the multi-dimensional average value.

23 Claims, 7 Drawing Sheets

U.S. PATENT DOCUMENTS

| | | | |
|---|---|---|---|
| 4,843,538 A | 6/1989 | Lane et al. | 700/83 |
| 4,873,623 A | 10/1989 | Lane et al. | 700/83 |
| 4,951,190 A | 8/1990 | Lane et al. | 700/83 |
| 4,967,381 A | 10/1990 | Lane et al. | 702/81 |
| 5,225,998 A | 7/1993 | Singhal | 702/84 |
| 5,440,478 A | 8/1995 | Fisher et al. | 702/179 |
| 5,479,340 A | 12/1995 | Fox et al. | 702/181 |
| 5,715,181 A | 2/1998 | Horst | 702/181 |
| 5,943,237 A | 8/1999 | Van Boxem | 703/6 |
| 6,505,090 B1 * | 1/2003 | Harakawa | 700/121 |

* cited by examiner

PRIOR ART

QUALITY SURVEILLANCE OF A PRODUCTION PROCESS

BACKGROUND OF THE INVENTION

1. Field of the Invention

The invention relates to a method for monitoring a quality of a plurality of particularly different technical products types which are produced in a manufacturing process.

2. Discussion of Background Information

In every production, the quality of the manufactured products has to be monitored. In this regard, statistical process control is used for controlling and improving quality and for monitoring manufacturing processes. In principle, there are two requirements to be met by a quality monitoring.

The operator of a machine in a production line needs a rapid decision basis according to which he can evaluate the batch which has just been manufactured and measured.

The person in charge of quality control wants a rapid and complete survey of the manufacturing processes and the quality of all products manufactured. This survey does not have to be on-line, but on the contrary should indicate long-term tendencies and constitute a decision basis for process modifications or error analysis.

Figure 2:
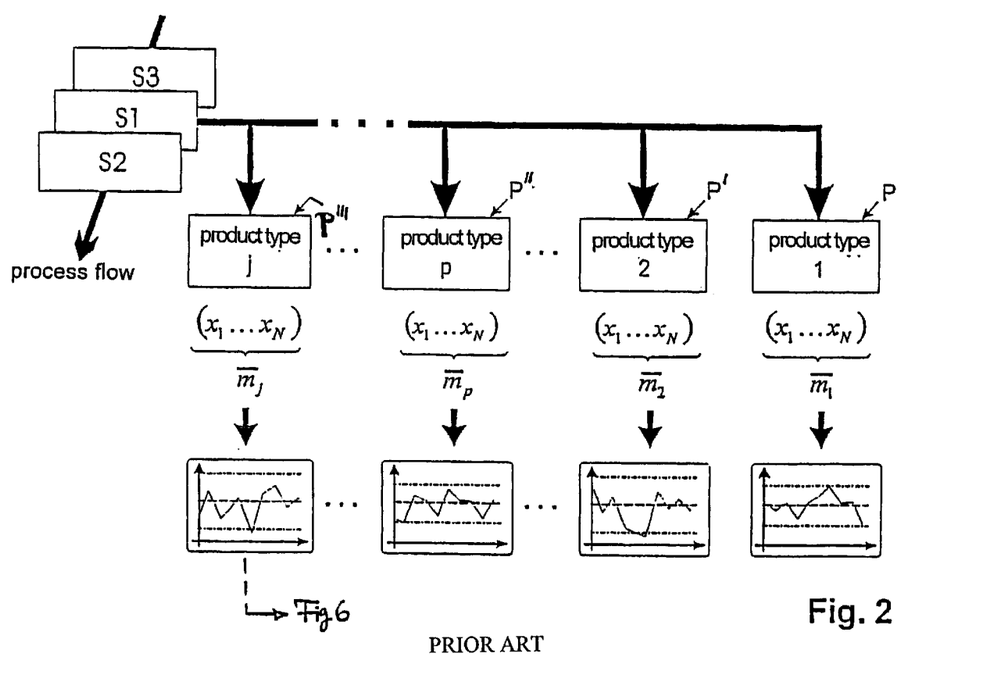
FIG. 2 shows an example of a usual prior art procedure of establishing Shewart-cards.

Until now, each parameter to be controlled of a product has to be monitored with the help of an individual representation, e.g. a control card. Since a product passes through many manufacturing steps, many control cards are required. When a lot of different products (product types) pass through a production line, a particularly great number of control cards are required which all have to be analyzed. For this purpose different ideas realized with the help of computers are known, according to which the great number of cards are automatically monitored with respect to exceeded control limits and which try to display large data quantities as distinctly as possible. FIG. 2 illustrates a manufacturing process consisting of a sequence of processes (process flow) which is passed through by j different product types (p=1 . . . j), an individual card (e.g. a Shewart-card according to FIG. 6) being set up. This procedure has some principle disadvantages:

A possibly very large number of individual cards cannot be visualized distinctly. There is no method of displaying the monitoring of the complete quality of all technical products of a production line.

When the different product types have for example a high positive correlation and when the process is monitored by several individual cards, it cannot be determined sufficiently safely whether the manufacturing process is still under statistical control: When within the control limits, random samples average values of the different product types differ much more than it is to be expected by said high correlation, the manufacturing process is most probably no longer under statistical control, although no trespassing of the limits by one of the products is signalized.

SUMMARY OF THE INVENTION

Therefore, the object of the invention is to provide for a method for keeping a plurality of different (several) product types, which are produced in a quasi-parallel manufacturing process, statistically monitored, for distinctly representing or displaying the data quantities produced and for improving the expressiveness of the measurements.

Claim 1, 12 or 14 are proposed for solving said problem.

A multiple products control is effected by representing or displaying a course of a state variable by which the manufacturing processes and the quality of the products manufactured in productions comprising a large number of product types (e.g. ASIC production) may be controlled rapidly and distinctly. In each manufacturing step, the quality of all product types, which pass through said at least one manufacturing step, may be monitored and distinctly displayed together by said control method. Measured values from a manufacturing station are collected during a defined time interval, said measured values being displayed as an obligatory state value only after the expiry of said time interval.

Said multiple products control (for controlling product average values) may be used for simultaneously monitoring said large number of products. Said representation or display expressively illustrates a statistical state of a manufacturing process.

The invention provides a method for rapidly and reliably monitoring the quality of all products passing through a respective manufacturing step in productions comprising a large number of products (broad product range) and for distinctly visually representing or displaying the data pertinent to quality. Said multiple products control is also well-suited for a long-term analysis of quality and as a decision basis for possible slow modifications of the manufacturing processes.

Hotelling's $T^2$ statistical analysis as known from literature serves as a statistical basis for said multiple products control. According to the invention, said statistics is used for monitoring a technical parameter for a plurality of technical product types manufactured in a "quasi parallel" process (e.g. in semiconductor production) (claim 12).

A quality monitoring by said $T^2$ multiple products control has considerable advantages compared with prior art:

A rapid and reliable information on the statistical state of a technical manufacturing process is available.

By also considering in said display correlations that can exist between differently designed products, a statistically definite information independent of the degree of said correlation is provided.

The quality of all products manufactured in a manufacturing process is distinctly displayed.

A time-compressed representation provides for a long-term quality management and quality control, particularly for a recognition of tendencies in a manufacturing process.

The method uses average values of a random sample of products modified in their manufacturing state. Said average value is positioned as a part of a multi-dimensional average value. In fact, said multi-dimensional average value is convertible into a state value at any time, but it is converted into such an obligatory state value only after a determined time interval, said state value being represented either on a screen or graphically. Said determined time interval results from the manufacturing process. It is either a maximum time interval (claim 2), it may, however, also result from again subjecting a product type of a first type number to a physical modification in a monitored manufacturing station. In this case, the same product would provide two measured average values, and prior thereto, a multi-dimensional average value established until then is converted into an obligatory state variable. A further criterion may be determined by said defined time interval. Once all product types monitored having been physically modified in said monitored manufacturing station, an obligatory state variable may also be calculated, since no further measured average value is required for completing all product average values in said multi-dimensional average value. However, said aspect is a subordinate case of the criterion mentioned before; the subsequent requirement of a product type in said monitored manufacturing station would in any case satisfy the criterion mentioned before and release a calculation of said obligatory state variable.

Consequently, said state variable may also be calculated more frequently (claim 10), whenever a new product average value is supplemented to said multi-dimensional average value. Said value remains hypothetical, it is not registered in the obligatory course of said state variable.

If the number of monitored product types changes, i. e. the "first type number", a new initializing run has to be effected. The dimension of the used vectors changes as well as the supposed product average values (claim 11).

The supposed product average values are those values which are determined from preliminary calculations for a respective product type (claim 9, claim 3). A product average value replaces to a limited extent a measured average value in a multi-dimensional average value (average value vector). If in a calculation or in a forthcoming calculation of the state variable, a product has not been physically modified during the monitored manufacturing process, a product measured value thereof (a product average value consisting of measured values) is replaced by a predetermined product average value. When effecting a deduction (claim 3), said average value results in that said product is not registered with measured values in said state variable as an individual point, thus remaining neutral.

The course of said state variable with its state values registered point by point is compared with a limit value (claim 7) for emitting a signal.

Said multiple products control, which has been mentioned before and will be mentioned later, relates to a display of technically measured data from a manufacturing process, said display being provided in a distinct manner. Said graphical representation may be provided in several manners, an oscillogram or a graphical representation may be selected, said representation may also be registered on a card or plotted by a printer. The type of representation itself does not influence the technical conception which produces its basis, course and result by technical measured values in accordance with a technical process. The invention is ready or completed already when the graphical representation has been printed out, displayed or registered, its (human) analysis itself being outside of an inventive success. Thus, human qualifying influence is no matter of importance, said influence, on the contrary, being exerted after completing the invention.

DETAILED DESCRIPTION OF THE INVENTION

FIG. 2 shows a schematic illustration of a process monitoring in a process flow comprising steps S3, S1 and S2 (and further steps if required) which are sequentially lined-up, and a monitoring of several product types, said product types being designated P, P', P" and P'", in this embodiment having a control variable p=1,2, . . . ,p , . . . j. Each product type has a "product average value" calculated from a random sample of said product, said sample providing several measured values x. Said several measured values $x_1 \ldots x_N$ provide for an average value $\overline{m}_p$. For each product type, a control representation is selected which is recorded over a batch number (a batch date). If several parameters of a product are monitored, such a representation is provided for each parameter. By comparing the product average values with the control limits, a statistical control of the process flow is realized, however, it is obvious that for 10 product types with 3 parameters each already 30 control cards have to be handled and an analysis becomes more and more difficult, the more products and parameters are monitored. The illustrations of FIG. 2 are shown in an enlarged view of an embodiment according to FIG. 6. The Shewart card shown there illustrates averages values which are obtained from random samples over a time axis which is designated as batch date. A point is provided when a specific product or a specific parameter has been physically influenced. Therefore, the time axis is not equidistant, it is, however, dependent on a monitored parameter always having been modified and then an allocated point immediately being provided on the axis of abscisses. A connection of the points provides the course of a state variable x. The illustration shows a connection of average values calculated point by point from the process. Said course of average values is compared with a top limit $U_{CL}$ and a bottom limit $L_{CL}$, said limits being represented by broken lines. On the date of July 3 (last but one point on said date), the average value exceeds said top limit.

Figure 1:
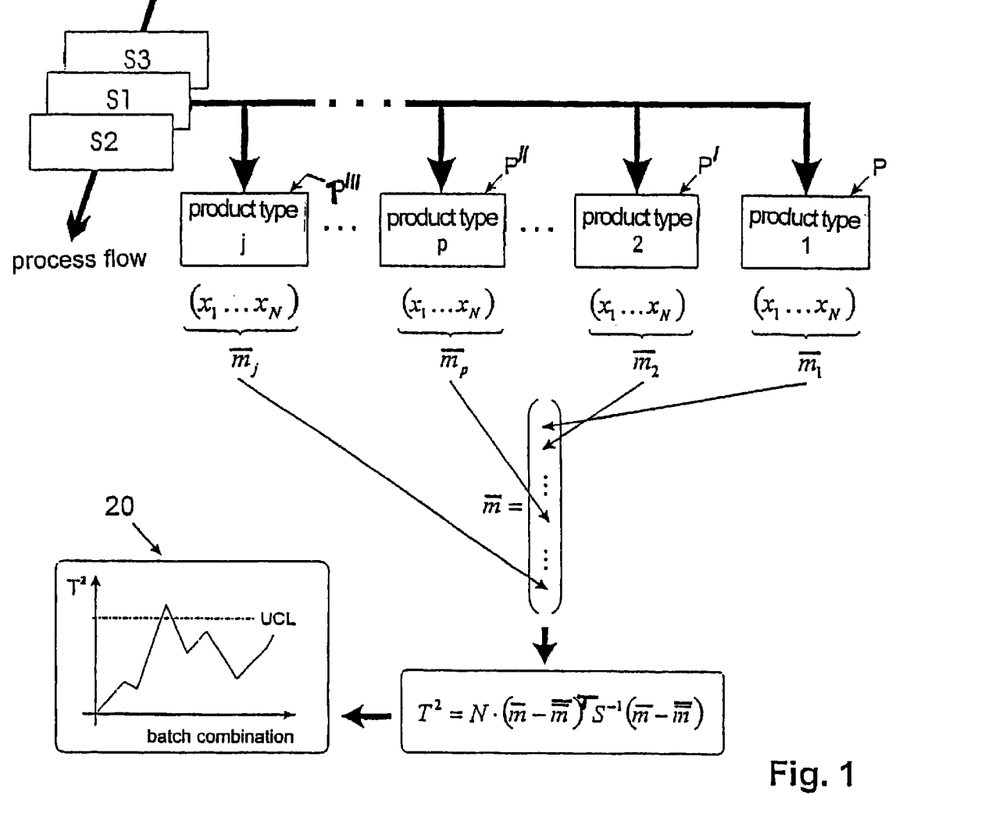
FIG. 1 illustrates an embodiment of a multiple products control according to the invention.

FIG. 1 illustrates the method proposed according to the invention and explained in the following. A common average value $\overline{m}$ is calculated by product average values $\overline{m}_p$ of individual product types exerting a common influence for commonly providing a point in a state course. It is clearly visible that only one representation 20 of a state variable course is determined from the four product types illustrated in FIG. 1, and that the distinctness is maintained even for a broad product range (large number of products).

Figure 3:
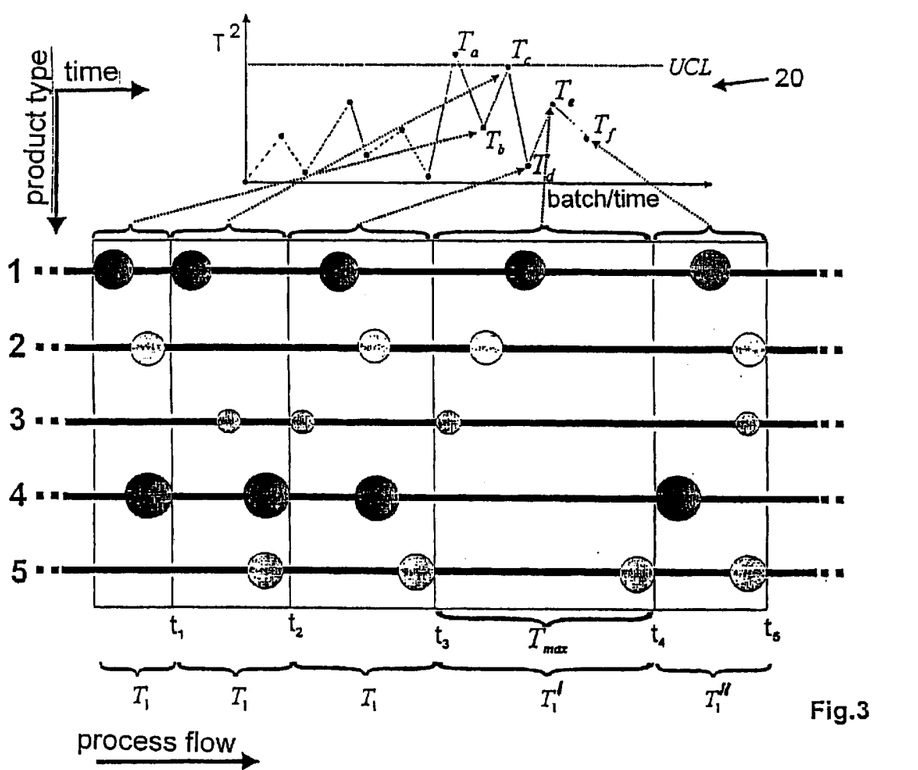
FIG. 3 illustrates embodiments of times of displaying a multiple products control.

The process flow shown in FIG. 1 also results from a schematic illustration according to FIG. 3. In said figure, the individual product types are marked by circles of different diameters. The product types 1 to 5 illustrated there pass through a manufacturing step S1.

Figure 4:
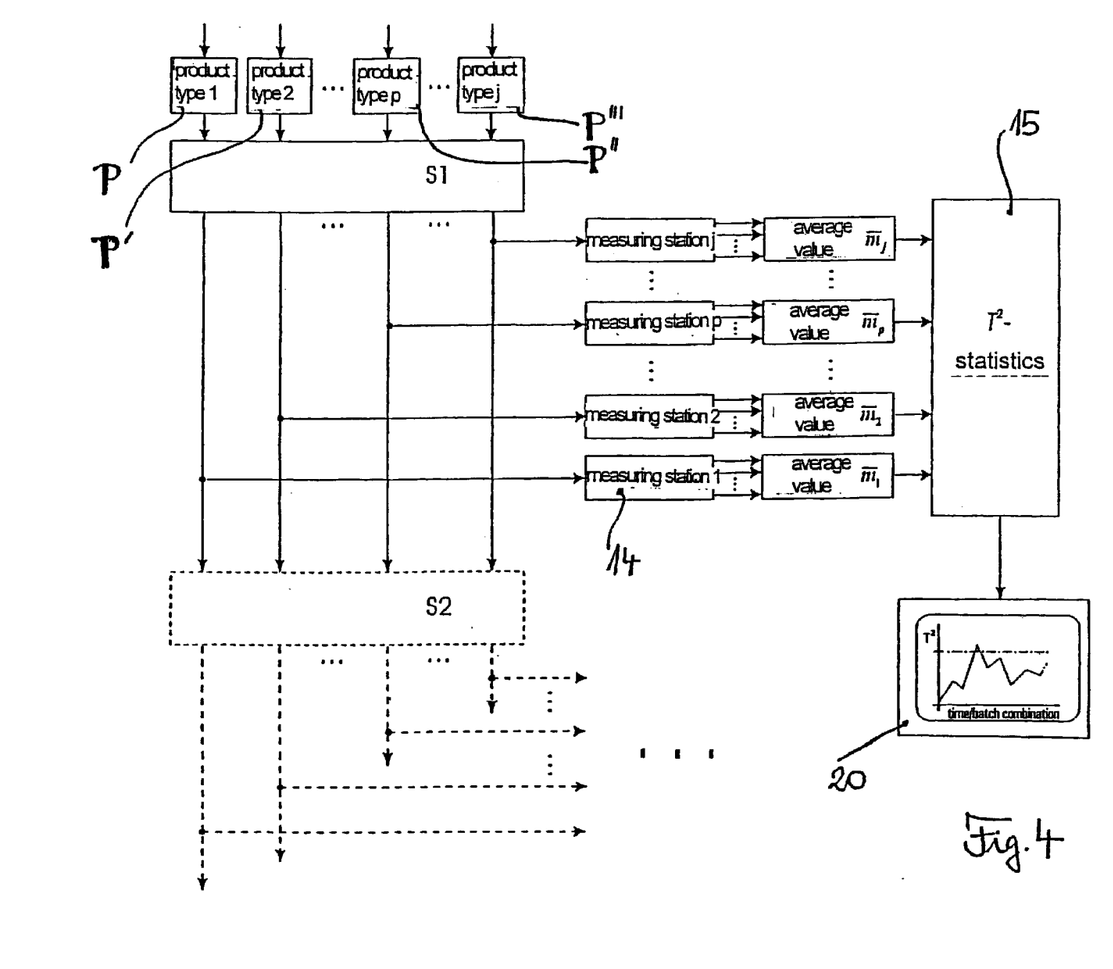
FIG. 4 is an illustration of measurements in a manufacturing process S1.

Prior to starting a multiple products control, a measurable product parameter is determined which is to be monitored by said multiple products control. Said parameter has to be recordable by measurement technical test methods after a technological process step for all products to be controlled. Suitable product parameters are e.g. structural widths d1, d2, layer thicknesses b1, concentrations, etc. FIG. 4 shows measuring arrangements 14 at a manufacturing station S1. Said measuring arrangement 14 is positioned graphically after said manufacturing station S1, but it is understood to express that it is allocated to said measuring station S1 such that the mentioned product parameters may be measured, which may evidently only be measured once having been physically modified by said station S1. Said physical modification requires a completion of at least one modification in said station, so that with respect to process logistics, said measurement is effected "after passing through said manufacturing station". The concrete measuring arrangement itself may also be integrated in said manufacturing station S1 itself, thus being realized by integrated measurement technology 14. The graphical illustration of FIG. 4 only expresses a logical flow, not the concrete measurement technical arrangement.

Once a product or several products of a type having passed through a manufacturing step S1 to be monitored and having been physically modified, a random sample is taken, i.e. N random sample measurements $m_1 \ldots m_N$ are effected on one or on different wafers. A random sample average value $\overline{m}_p$ for said product is obtained from said N random sample measurements:

$$\overline{m}_p = \frac{m_1 + m_2 + \ldots m_N}{N} \qquad \text{equation 3.1.2}$$

Each product manufactured subsequently is treated in the same manner, and for each product a characteristic average random sample value $\overline{m}_p$ determined, said value being supposed as a product average value of a product.

Since in general, the products are not manufactured simultaneously, but nevertheless a condensed and distinct representation 20 is desired, a time interval T1 is defined in which the manufactured products are combined and considered as "manufactured simultaneously". With the help of said time interval, said representation or display may be adapted to different manufacturing densities. Said time interval is not constant, however, for the measured values $T_a$, $T_b$, $T_c$ it is represented as being constant.

The average values of all products which are to be considered in said multiple products control are combined to a vector $\overline{m}$. If a product is not processed in a station within a corresponding time interval, a known product average value $\overline{\overline{m}}_p$ is used for its random sample average value $\overline{m}_p$. In general, for the vector $\overline{m}$ the following is obtained for j products:

$$\overline{m} = \begin{bmatrix} \overline{m}_1 \\ \overline{m}_2 \\ \vdots \\ \overline{m}_p \\ \vdots \\ \overline{m}_j \end{bmatrix} \qquad \text{equation 3.1.3}$$

$\overline{m}_p$: Random sample average value of a $p^{th}$ product p=1, 2 ... j, also designated as product average values. A multi-dimensional representation of all average values forms a vector (average value vector). Said vector is adopted in $T^2$-hotelling statistics:

$$T_2 = N(\overline{m}-\overline{\overline{m}})^T S^{-1}(\overline{m}-\overline{\overline{m}}) \qquad \text{equation 3.1.1}$$

$T^2$: value of test distribution
N: random sample value
$\overline{m}$: vector of random sample average values (measured)
$\overline{\overline{m}}$: vector of product average values (given)
S: covariance matrix According to equation 3.1.1, the vector of the product average average values according to 3.1.4 is deducted from $\overline{m}$.

$$\overline{\overline{m}} = \begin{bmatrix} \overline{\overline{m}}_1 \\ \overline{\overline{m}}_2 \\ \vdots \\ \overline{\overline{m}}_p \\ \vdots \\ \overline{\overline{m}}_j \end{bmatrix} \qquad \text{equation 3.1.4}$$

Thus, only the deviations from the respective product average values are adopted in said multiple products control. In equation 3.1.1, the difference vector resulting therefrom is multiplied by the inverted covariance matrix at the right and at the left thereof. When multiplying a scalar by said random sample value N, the value of the test distribution of a product combination manufactured in a considered time interval is finally obtained. Said $T^2$ value is adopted (displayed, stored or entered in a card) as a state variable in said multiple products control.

For calculating the value of the test distribution, the vector of the product average values $\overline{\overline{m}}$ and the covariance matrix S are used. Said vector and said matrix are determined when adapting said multiple products control to a concrete application case. k observation matrices (equation 3.1.5), which have to be established upon introducing a card, are a basis for determining said product average values and said covariance matrix. Said observation matrices comprise said N random sample measurements on j products.

$$M_k = \begin{bmatrix} m_{k11} & m_{k12} & \cdots & m_{k1j} \\ m_{k21} & m_{k22} & \cdots & m_{k2j} \\ \vdots & \vdots & \cdots & \vdots \\ m_{kN1} & m_{kN2} & \cdots & m_{kNj} \end{bmatrix} \qquad \text{equation 3.1.5}$$

In said equation, index k designates the number of observation matrices, thus the number of random samples for each product which are considered for estimating the average value and the covariance matrix. k is also designated as preliminary value. The random sample average value $\overline{m}_{kp}$ and the random sample variance $S_{kp}^2$ for the $p^{th}$ product and the $k^{th}$ preliminary measurement result from equation 3.1.5 as:

$$\overline{m}_{kp} = \frac{1}{N} \sum_{i=1}^{N} m_{kip} \qquad \text{equation 3.1.6}$$

$$S_{kp}^2 = \frac{1}{(N-1)} \sum_{i=1}^{N} (m_{kip} - \overline{m}_{kp})^2 \qquad \text{equation 3.1.7}$$

The covariance $S_{kp_1p_2}$ which describes the correlation between the product $p_1$ and the product $p_2$ for the $k^{th}$ random sample is:

$$S_{kp_1p_2} = \frac{1}{(N-1)} \sum_{i=1}^{N} (m_{kip_1} - \overline{m}_{kp_1})(m_{kip_2} - \overline{m}_{kp_2}) \qquad \text{equation 3.1.8}$$

In a next step, the random sample average values determined by k preliminary measurements are averaged, and a product average value for the $p^{th}$ product is obtained. R designates the maximum number of preliminary values k:

$$\overline{m}_p = \frac{1}{R}\sum_{k=1}^{R} \overline{m}_{kp} \qquad \text{equation 3.1.9}$$

When writing all product average values of the individual products as a vector, the searched vector of the product average values $\overline{m}$ of equation 3.1.4 is obtained.

Similar to the procedure of estimating the product average values, the random sample variances and random sample covariances are averaged over said preliminary value k:

$$S_p^2 = \frac{1}{R}\sum_{k=1}^{R} S_{kp}^2 \qquad \text{equation 3.1.10}$$

$$S_{p_1 p_2} = \frac{1}{R}\sum_{k=1}^{R} S_{kp_1 p_2} \qquad \text{equation 3.1.11}$$

When writing equation 3.1.10 and 3.1.11 as a matrix, the searched symmetrical covariance matrix S is obtained:

$$S = \begin{bmatrix} S_1^2 & S_{12} & \cdots & S_{1p_2} & \cdots & S_{1j} \\ S_{12} & S_2^2 & \vdots & \vdots & \cdots & S_{2j} \\ \vdots & \vdots & S_p^2 & \vdots & \cdots & \vdots \\ S_{1p_2} & \vdots & \vdots & \ddots & & S_{p_1 j} \\ \vdots & \vdots & \vdots & & \ddots & \vdots \\ S_{1j} & S_{2j} & \cdots & S_{p_1 j} & \cdots & S_j^2 \end{bmatrix} \qquad \text{equation 3.1.12}$$

Said monitoring method is suited for monitoring the quality of all products or product types passing through a process flow and for signalizing deviations critical for quality. The quality of a large number of products passing through a manufacturing step may be monitored by one single distinct control representation. The correlation between products passing through an equal manufacturing step are also taken into account. It is also considered that the different products have different manufacturing frequencies and therefore pass through the manufacturing step—S1 is represented in this embodiment—in a very different order. Further, a reliable evaluation of the statistical stability of a manufacturing process is provided by analyzing one single control display 20.

Before implementing a multiple products control method in a manufacturing process, estimates for product average values and a covariance matrix are available, as described before.

For more exactly defining the fields, in which an application of said multiple products control method seems appropriate, a course of production (process flow) in a flexible production shall be described more in detail as follows:

A main characteristic feature for a flexible production is the requirement of quickly and flexibly reacting to customers' orders. Therefore, many different products generally pass through a process flow, said products having different process parameters, process sequences and batch sizes. Simultaneously, a complete quality monitoring and a control of the manufacturing process shall be guaranteed.

Figure 6:
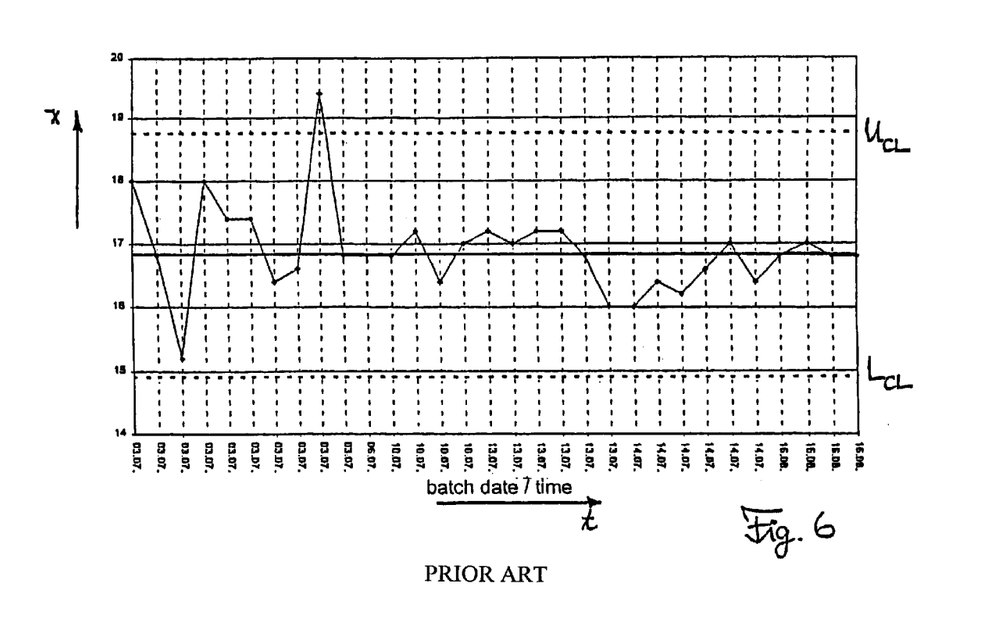
FIG. 6 is a Shewart-card

According to the known monitoring conception as shown in FIG. 2, a control card, e.g. according to FIG. 6, has to be established for each product and each process parameter to be monitored, and monitored with regard to exceeding control limits. A large number of control cards result from the multitude of products, said control cards having to be monitored and analyzed.

Instead of establishing and monitoring an individual control card for each product passing through a manufacturing step, a multiple products control for all products passing through a manufacturing process is effected by calculating a $T^2$ value from product average values.

Since, however, the products generally do not pass simultaneously through a manufacturing step, but are manufactured subsequently, said product average values $\overline{m}_p$ may be combined according to defined rules, in order to be displayed more distinctly.

In FIG. 3, five different products (types 1 to 5) are shown, which pass through a manufacturing step. The batch sizes vary between the products, which is illustrated by circles of different sizes. For establishing a multiple products control, measured values of the product types 1 to 5, which are manufactured successively, may be combined as long as either a maximum time interval $T_{max}$ is achieved or a product is manufactured in the same station again. Each time interval results in a point $T_a$, $T_b$, $T_c$ in said multiple products control or a corresponding display 20. Products not being manufactured in a relevant time interval are not considered in the calculation of said $T^2$ value and thus do not pass into the relevant $T^2$ point.

Figure 5:
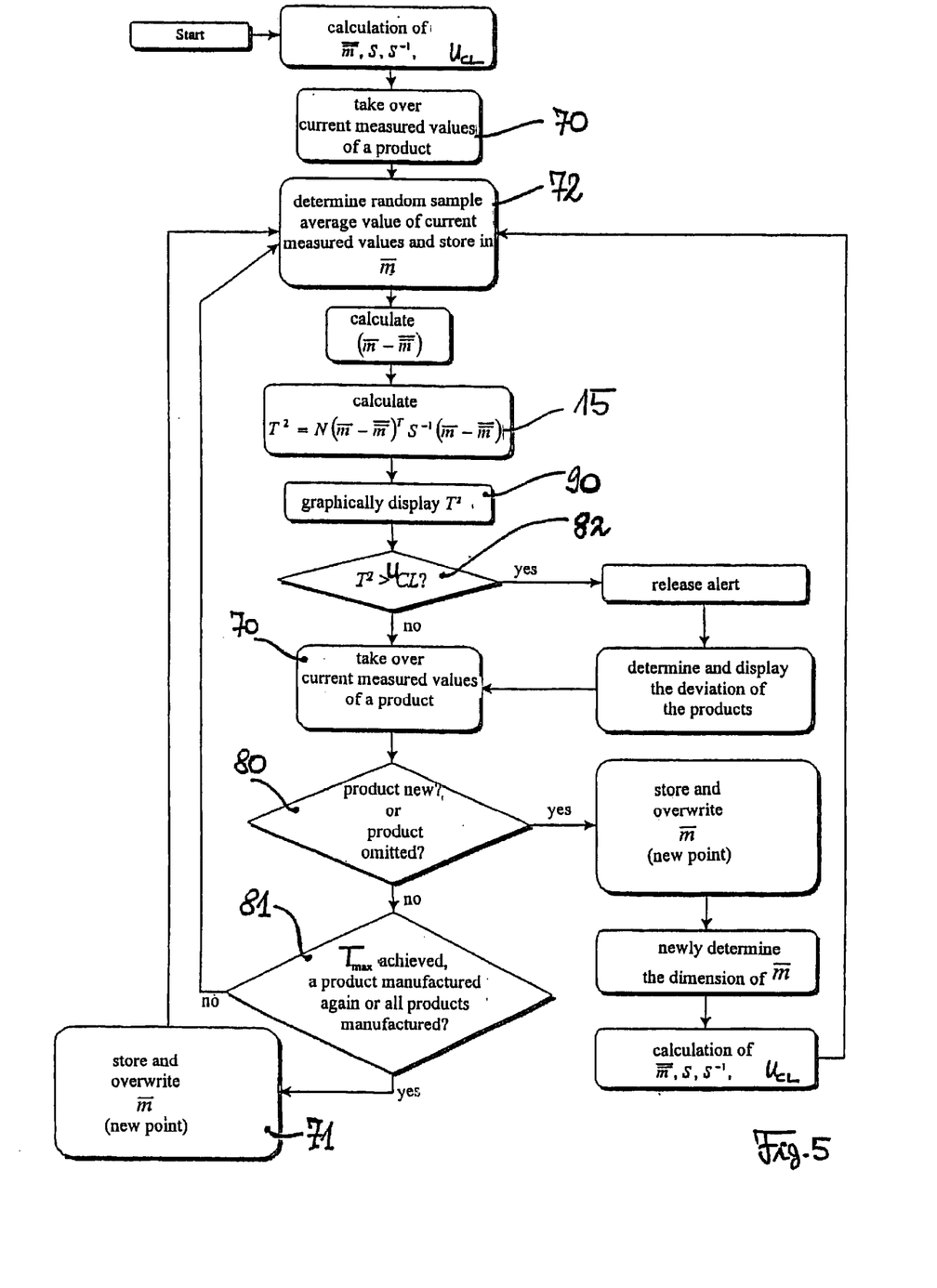
FIG. 5 illustrates a process flow control relating to FIG. 1.

FIG. 3 illustrates several times $t_1$, $t_2$, $t_3$, $t_4$ and $t_5$ and shows the possibilities of defining a time interval $T_1$ and thus determining when a measured value $T_a$, $T_b$, $T_c$ relevant for a course 20 is applied or displayed. A calculation of said measured value is shown in FIG. 5, to which reference is made in combination with FIG. 3 described here. In a first time interval from 0 to $t_1$, product types 1, 2 and 4 were manufactured, product type 1 having been manufactured first and thereafter product types 2 and 4 having been manufactured simultaneously. Product type 1 again requiring a physical modification at a time $t_1$ in a manufacturing station S1, which is illustrated here, a point $T_b$ is calculated and marked or plotted. For product types 3 and 5, there was no manufacturing required in said manufacturing step S1 during the regarded time interval between 0 and $t_1$, so that no measured values are available which could have been measured with an arrangement according to FIG. 4. Instead, a predetermined average value as described before is used, which average value is available for said product types 3 and 5 and does not affect the amplitude in the calculation used according to equation 3.1.1.

In a second time interval between $t_1$ and $t_2$, product types 1, 3, 4 and 5 are manufactured. In said time interval, product type 2 is not manufactured or not modified in its physical state. In said station, product type 3 again requires a physical modification, so that a new state value according to equation 3.1.1 is calculated, said state value being marked as a value $T_c$ in said display 20. For said time interval $t_1$ to $t_2$, a corresponding product average value, which is neutral, was used for product type 2.

In a time interval $t_2$ to $t_3$, it is illustrated that all five product types 1 to 5 were physically modified in said station S1. Therefore, a new state value $T_d$ may be calculated immediately after affecting said product type 5. Practically at the same time, said product type 3 requires a further physical modification in said station S1, so that a time interval $T_1$ would nevertheless have been regarded as terminated when repeating the physical treatment of a product type.

The three aforementioned time intervals show that a further production of a product already manufactured once determines the end of a first time interval $T_1$. If, however, all monitored product types were already manufactured in station S1, the next requirement would satisfy said criterion in any case, so that said time $T_1$ may immediately be regarded as concluded, and a state value may be marked in said graphical representation 20.

In a following time interval $T_1'$, a maximum time is applied, $T_1'-T_{max}$. In said time interval, the product types 1 to 3 and 5 were manufactured. In said predetermined maximum time interval, no further product type required a physical modification in said station S1, so that a limit value is applied, determining when a state value $T_e$ is calculated. For said time interval, the product average value is supposed for product type 4.

In a last recorded time interval $T_1''$, all five product types were manufactured, this time in a shorter time interval than in said time intervals $t_1$, $t_2$ and $t_3$. Thus, the time interval between $t_4$ and $t_5$ reflects a state value $T_f$, calculated according to equation 3.1.1 as described before.

The diagram 20 thus obtained, which shows the state value $T^2$, is a standard for the manufacturing quality, in this embodiment in a manufacturing process S1. Said state value is compared with a maximum control value $U_{CL}$, which, when exceeded, indicates irregularities.

Consequently, a corresponding obligatory state value is not always calculated when a product type has been physically modified, but only after expiry of a determined time interval resulting from the process flow. Only then, the state value $T_a$, $T_b$, . . . relevant to said display 20 becomes obligatory. In the flow chart of FIG. 5, it may also occur that said state value is calculated every time, e.g. in an inner loop indicated there, but that it is not taken over for the obligatory representation 20. It is only taken over when said predetermined time interval T1, as explained, has expired, said predetermined time interval being either a maximum time interval or the time interval after which all products in said manufacturing process S1 (manufacturing station) were manufactured. A subcase of the last mentioned criterion is an embodiment in which an equal product type again requires a physical modification in the same manufacturing station, without an obligatory state value having been registered in said representation 20 before.

The storage of process values illustrated as measurements in FIG. 4, which process values may be structural thicknesses or structural widths of a semiconductor manufacturing process, provides an incremental supplementation of an average value vector, the individual average values of which are gradually filled up with measured values of the different product types and then converted into a state variable according to equation 3.1.1. Measured values which are still missing until their calculation, are temporarily filled up by product average values which are neutral with respect to the result. In the course described, it may also occur that only one measured value passes into said average value vector, whereas all remaining measured values are the product average values. Theoretically, it may even occur that no product type at all requires a processing in the maximum time interval $T_{max}$, so that only product average values are used by said calculation 15, a neutral state value thus being calculated.

The method as described with respect to FIG. 3 may also be illustrated by a flow chart according to FIG. 5 which is completely taken into account by explicit reference thereto, the expert not having problems in taking the control process of a determination of a state variable course from the inquiries (rhombs) and functions (rectangles). The described flow chart is a feature of a software controlled process, but may also be realized in corresponding hardware components.

Starting point "Start" is the calculation of a covariance matrix and of the product average values (vector of said average values) as well as of the limits with which said state value course shall be compared. The current measured values of a product are taken over, which measured values shall be described with regard to the measurement according to FIG. 4. In a functional block 90, the control according to FIG. 5 shows a graphical representation of said state value in said diagram 20, which state value is, however, repeatedly overwritten due to the existing loop, thus having a temporary character. Due to an inquiry 82, temporary state values are also used for releasing alert, in a corresponding modification, the release of alerts and the corresponding inquiry 82 may also be provided prior to a functional block 71 after the exit of said inner loop.

Functional blocks 70 in said loop and as an initial function prior to said loop are identical, they relate to taking over measured values from the process flow, as illustrated in FIG. 4, and to manufacturing station S1 specifically illustrated there.

The criterion described before according to FIG. 3, is comprised in an inquiry 81 of FIG. 5. If one of said criterions is satisfied, said time interval $T_1$ is determined or has expired. An obligatory point in the graphical representation 20 is provided.

When new products are supplemented, a product is omitted or the measured parameters change, said inquiry 80 initiates a termination of said loop and starts, as described initially after "Start" to pass again into the described loop.

In said functions 72 or 71, the average value vector is gradually filled up by correspondingly re-storing the old value. The state value of the course of said representation 20 either results from said function 90 or in connection with said function 71, as described before.

The display of said state values 20 according to FIG. 4 is a consequence of a conversion 15, which was explained in FIG. 5. The measured values of the process which affect said conversion 15 are illustrated in FIG. 4 by measuring stations 14, namely such measuring stations, which measure as measuring arrangements certain parameters of said product types 1, 2, p to j after a physical modification in said station S1. A determined parameter is allocated to each product type, said parameter being measured at said product type. Also several parameters of a product type may be measured, but at least one is required. An average value is calculated from the measured values taken from a random sample, said average value being shown at said conversion 15 which is described in FIG. 5 between said functions 72 and 90 and in said equation 3.1.1.

FIG. 4 does not illustrate more in detail which physical parameters are measured, a corresponding determination depending on the manufactured products. In a semiconductor production, structural widths b1 or structural thicknesses d1, d2 of certain semiconductor elements in a PAL or ASIC may serve as basis, said structural widths or thicknesses being affected by a corresponding process, after which process a measurement is effected.

FIG. 4 shows that further manufacturing processes S2, S3, etc., as also shown in FIG. 1, may follow, said manufacturing processes also being passed through by said product types 1 to j. A graphical representation 20 is established for each manufacturing process, for keeping a process flow comprising several manufacturing processes S1, S2, S3 under statistical control.

Figure 7:
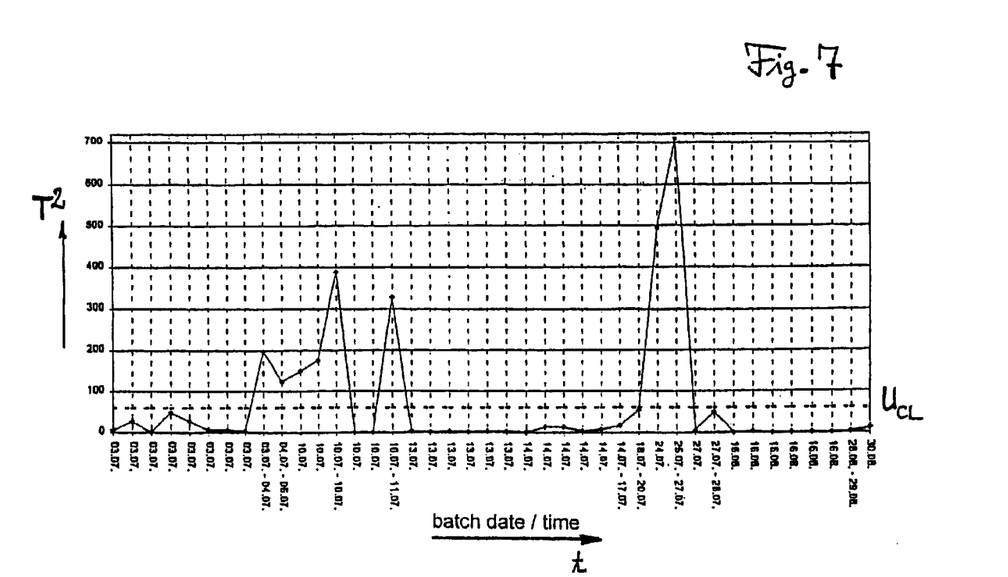
FIGS. 7 and 8 are linear and logarithmic illustrations of a state variable $T^2$ resulting form several products, in this embodiment registered on a card.
Figure 8:
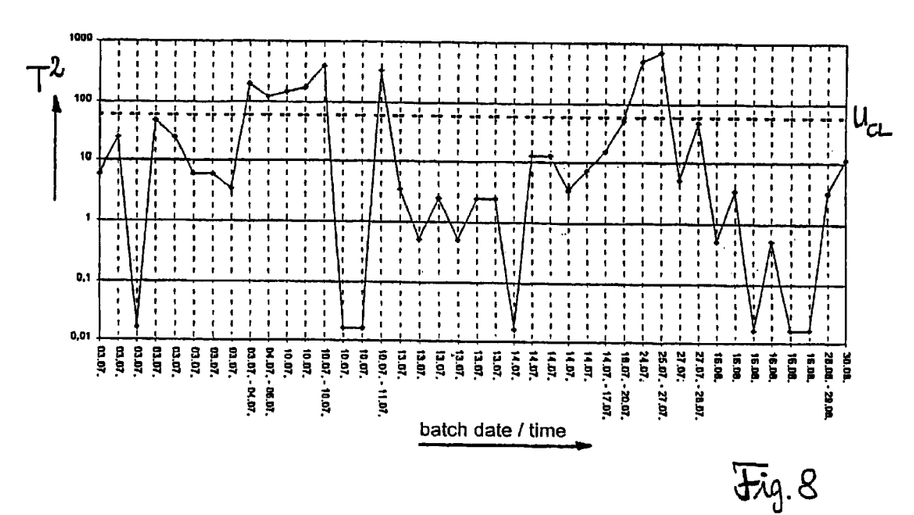

FIGS. 7, 8 illustrate an embodiment of a state variable course of said display 20, said figures, despite their similar outer appearance, comprise a considerably more expressive and more distinct representation compared with FIG. 6, much more process information being contained in the individually marked state points, than in the Shewart card of FIG. 6. An example of an oven in which four different layers are applied onto four different products using different processes is shown as a result in FIGS. 7 and 8 and will be described at the end.

The method provides a distinct and condensed display of a manufacturing process, by which display the statistical state of the process and the quality of the manufactured products may be evaluated "at a glance". The product average values of the individual products being combined, the field of application resides in a superior analysis of the manufacturing process, e.g. by a person in charge of SPC or the head of a line.

Hotelling $T^2$ statistics serve as a statistical basis, representing a generalization of an univariant t-test. Equation 3.1.1 shows said hotelling statistics.

$$T^2 = N(\overline{\overline{m}} - \overline{m})^T S^{-1} (\overline{\overline{m}} - \overline{m}) \qquad \text{equation 3.1.1}$$

$T^2$: value of test distribution (state value)
N: random sample value
$\overline{m}$: vector of random sample average values
$\overline{\overline{m}}$: vector of product average values
S: covariance matrix In plain words, a graphically marked multiple products control is a hypothetical test, just as the classic control cards. It is tested, whether an average value of a random sample differs from a know or sufficiently well estimated average value of a basic entity. When the value of a test distribution is within the predetermined control limits, a hypothesis "random sample belongs to original basic entity" is accepted. The process is most probably under statistical control. When the value of said test distribution is outside of said control limits, said hypothesis has to be given up most probably. Said process is no longer under statistical control.

The control limit is selected such that the probability of a type I or type II error gets very small. Type I error: A hypothesis is given up erroneously. Type II error: A hypothesis is accepted erroneously.

Said multiple products control testifies about a combination of products. Trespassing a limit means that the regarded manufacturing process is most probably no longer under statistical control. As far as the quality of manufactured products in case of a trespassing of the control limit is concerned, a distinction may be made between two cases: Regarding the corresponding product average values shows either that one or several products have exceeded their control limit (e.g. a 3σ-limit) or that many products simultaneously approach their control limit. In this case, the manufactured products are in order as far as their quality is concerned, however, the statistical stability of the process has to be doubted anyhow, since it is very improbable that many products are simultaneously approaching their control limit.

When a product was not manufactured in the considered time interval, the product average value as an estimated average value of the basic entity of the product is supposed as a "measured value". Said product does not affect the value of the test distribution.

Besides a monitoring of exceeded control limits, said multiple products control provides further analysis methods. By chronologically arranging and displaying data of a manufacturing process, longer-term tendencies may easily be recognized, said tendencies not being visible in a process control by individual cards due to different manufacturing frequencies. Therefore, compared with a monitoring by individual cards, said multiple products control provides more information about the process to be controlled.

All products to be monitored passing through the same process step, the random sample average value of a product, which value is determined from the random sample measured values after production, will correlate with the random sample average values of the other products. Subject to the degree of correlation between the products, the probability of meeting all or several products at a certain value relative to their average values, changes. When the degree of correlation between the products is high, the probability is high that, if a product shows a certain deviation from the product average value, also many other products show an equal deviation from their respective product average values. When the degree of correlation between the products is small, said probability decreases. Thus, the degree of correlation between the products affects the value of the test distribution $T^2$ and the position of the control limit. Therefore, the correlation between the products are determined and perhaps adapted periodically.

The so-called IIND condition is satisfied for practical application, such as for classic control cards. Said condition states that the data which are to be analyzed by said control have to be independent of each other and normally distributed. In this embodiment, said IIND condition means that on one hand, all vectors of the random sample average values are independent of each other, on the other hand, the average values of the random samples of the individual products are multi-normally distributed.

The exact position of a control limit for said multiple products control supports its expressiveness. For classic Shewart cards, said control limit is for example positioned such that an excess of the limit occurs at values of said test distribution which are more distant from the average value than a triplicate standard deviation (3σ-limit). Said behaviour should also be achieved in a multiple products control. If therefore a product of a present product combination trespasses its 3σ-limit, a limit excess shall be acknowledged by said multiple products control.

When the degree of correlation between the products is not too high, a control limit $U_{CL}$ may be calculated by subsequently adjusting each product type e.g. at its 3-sigma value, whereas the corresponding other product types are adjusted at their product average value. These vectors are subjected to a hotelling statistics. The smallest $T^2$ state value thus obtained represents the control limit $U_{CL}$.

The operation manner of the multiple products control shall be described more in detail by the following embodiment. In this respect, an oven is regarded in which four different layer thicknesses are applied onto four different products by different methods. One of said products originates from a product type used more frequently, the other products have smaller batch sizes and are manufactured less frequently.

The intention is to monitor the layer thicknesses of all 4 products. To obtain a condensed representation, said products are combined to a data point in said multiple products control, when the different products are manufactured within a time interval of four days at maximum. When one or several of the four regarded products are not physically affected (manufactured) at said oven within said maximum time interval of 4 days, the product average value of the specific product is supposed for the state value (data point) to be calculated, said state value being calculated after the expiry of the maximum time interval. Said maximum time interval may vary considerably, depending on the products to be manufactured. It may vary between several hours and several days, in the embodiment regarded here, however, said interval was set rather high due to the thermally slow oven, and amounts to the mentioned four days. The maximum time interval supposed according to this embodiment, corresponds to the time interval between the times $t_3$ and $t_4$ illustrated in FIG. 3.

For a graphical representation, the average values, variances and covariances were determined. Therefrom, a 4×4 covariance matrix was established (equation 3.15) and inverted (equation 3.16):

$$S = \begin{bmatrix} 0{,}133 & 0{,}120 & -0{,}005 & 0{,}305 \\ 0{,}120 & 0{,}410 & 0{,}117 & 0{,}290 \\ -0{,}005 & 0{,}117 & 0{,}720 & 1{,}000 \\ 0{,}305 & 0{,}290 & 1{,}000 & 8{,}808 \end{bmatrix} \quad \text{equation 3.15}$$

$$S^{-1} = \begin{bmatrix} 11{,}661 & -3{,}461 & 1{,}239 & -0{,}431 \\ -3{,}461 & 3{,}599 & -0{,}723 & 0{,}084 \\ 1{,}239 & -0{,}723 & 1{,}829 & -0{,}227 \\ -0{,}431 & 0{,}084 & -0{,}227 & 0{,}152 \end{bmatrix} \quad \text{equation 3.16}$$

In the embodiment, the control limit is selected at $U_{CL} = 59{,}28$.

Each time one of the four products exceeds its 3σ-limit in a Shewart card, an infringement of the limit in the multiple products control according to FIG. 7, 8 is also obtained. If one or more of the products approach said 3σ-limit, the state value of the multiple products control also approaches said control limit $U_{CL}$. The determination of a coincidence with a limit infringement in a Shewart card is not illustrated, the Shewart cards of the four regarded products not being shown individually. Said limit $U_{CL}$, however, being distinctly marked by a dotted line, FIGS. 7 and 8 illustrate which state values according to FIG. 5 release alert.

In summary, a multiple products control or a multiple products control display as a supplement to the classic individual cards provides considerable advantages in a flexible production. Besides a simple and distinct monitoring of the product quality, the statistical stability of the manufacturing processes may simply and distinctly be monitored. The number of cards to be controlled is drastically reduced by introducing a multiple products control. Due to a time compression and a display of product combinations, said multiple products control is particularly suited for quality management, longer-term analysis and as a basis for the recognition of tendencies.

What is claimed is:

1. Method for monitoring a quality of a plurality of particularly different technical product types (P,P',P'',P''') which are produced in a quasi-parallel manufacturing process, said manufacturing process comprising several sequentially arranged manufacturing stations (S1,S2,S3), and a course of a state variable ($T^2$) for at least one (S1) of said manufacturing stations being determined point-by-point and displayed (20), wherein
    (a) a number of product types to be monitored is determined as a first type number (j);
    (b) a technical product parameter (d1,d2,b1) which is affected in said at least one manufacturing station (S1), is determined, and a measuring arrangement (10,11,12) is allocated to said manufacturing station for measuring said technical product parameter for at least one of said monitored product types (S1);
in said manufacturing process
    (c) a random sample of a (first) product type, modified in its physical state in said manufacturing station (S1), is taken from said first type number of product types, and (first) measured values are determined for said determined technical product parameter of said random sample;
    (d) an individual average value ($\overline{m}_p$) is calculated from said measured values and said average value ($\overline{m}_p$) is stored in a multi-dimensional average value ($\overline{m}$) attributed to said first type number;
    (e) said steps (c) and (d) are repeated for at least one further product type (P') to supplement at least one further measured average value ($\overline{m}_{p+1}$) to said multi-dimensional average value ($\overline{m}$);
    (f) (only) after the expiry of a defined time interval (T1), said stored multi-dimensional average value, comprising several individual average values, is converted (15) together to a state variable and one of stored and graphically represented (20) as a point ($T_a,T_b,T_c$) of the course of said state variable ($T^2(t)$).

2. Method according to claim 1, wherein said first time interval is determined such that one of a predetermined maximum time interval ($T_{max}$) has passed and one of said first type number of product types is to be physically affected again in said at least one manufacturing station (S1), particularly said first type number of product types having (all) passed said at least one manufacturing station (S1).

3. Method according to claim 1, wherein a state value is calculated from said multi-dimensional average value by a Hotelling's $T^2$ statistical analysis, said multi-dimensional average value, prior to a calculation (15), being deducted from a given multi-dimensional average value ($\overline{m}$) or vice versa, for only considering a deviation of said measured multi-dimensional average value from said given average value vector in said calculation.

4. Method according to claim 3, wherein said given multi-dimensional average value ($\overline{m}$) is determined from a plurality of preliminary measurements (k) in a manufacturing process, particularly being updated in said manufacturing process.

5. Method according to claim 1, wherein said technical product parameters are one of a layer thickness (d1,d2), a structural width (b1), a structural length and disturbance factors, such as defective densities or particle densities, as well as other linear dimensions in, at or on said product types, particularly in a method for manufacturing semiconductors on wafers or for manufacturing customer-specific semiconductor components each having a defined individual structure per product type.

6. Method according to claim 2, wherein said maximum time interval ($T_{max}$) is between several hours and several days, particularly depending on one of a use to capacity of said manufacturing stations (S1,S2,S3), the product type, the number of product types as type number and the maximum time resolution.

7. Method according to claim 1, wherein a limit value ($U_{CL}$) is determined for comparing the course of said state variable ($T^2$, $T_a$, $T_b$, $T_c$) with said limit value and for emitting a signal, particularly an information, when the course of said state variable exceeds said predetermined limit value ($U_{CL}$) in at least one point.

8. Method according to claim 1, wherein said graphical representation (20) is displayed on a monitor or printed on a card.

9. Method according to claim 1, wherein said average value ($\overline{m}_p$) of a product type in said first type number of product types, upon being converted (15) according to step (f), is set at a given average value without being affected by measured values with regard to the technical product parameter related to said average value, when the physical state of said related product type has not been affected in said manufacturing station (S1) during a maximum time interval ($T_{max}$).

10. Method according to claim 1, wherein said stored multi-dimensional average value is (also) converted (90, 15) to a hypothetical point of the course of said state variable, each time a new measured average value ($\overline{m}_p$) has been supplemented to said multi-dimensional average value.

11. Method according to claim 4, wherein said or each given average value ($\overline{m}$) is newly determined for all monitored product types, when said first type number changes.

12. Method for monitoring the quality of a plurality of particularly different technical products (P,P',P'') which are produced in a quasi-parallel manufacturing process, said manufacturing process comprising several manufacturing stations (S1,S2,S3), and the course of a state value ($T^2$) of at least one (S1) of said manufacturing stations being determined point-by-point (20), wherein (a) a number of products to be monitored is determined as a first type number (j);

(b) a technical product parameter (d1,d2,b1) of said products, which parameter is affected in said at least one manufacturing station (S1), is determined, and a measuring arrangement (10,11,12) is allocated to said manufacturing station, for measuring said technical product parameter for at least one of said products to be monitored after having been influenced by said manufacturing station (S1);

in said manufacturing process (c) a random sample of a first product modified in its physical state in said manufacturing station (S1) is taken from said first type number of products, and measured values ($m_1$, $m_2$, $m_N$) are determined for said defined technical product parameter;

(d) an individual average value ($\overline{m}_p$) is calculated which results from the measured values of said measuring arrangement, and said average value ($\overline{m}_p$) is stored in a multi-dimensional average value ($\overline{m}$) attributed to said first type number (j);

said stored multi-dimensional average value, comprising several individual average values, is converted together to a state value and stored or graphically represented (20) as a point ($T_a$,$T_b$,$T_c$) of the course of said state value ($T^2(t)$), said state value being calculated by a Hotelling's $T^2$ statistical analysis.

13. Method according to claim 12, wherein, prior to being converted (15), a stored average value vector is deducted from a given average value vector ($\overline{m}$) or vice versa, for only considering a multi-dimensional deviation of said measured average value vector from said given average value vector.

14. Method for monitoring the quality of a plurality of particularly different technical products (P,P',P'') which are produced in a manufacturing process, said manufacturing process comprising several manufacturing stations (S1,S2, S3) and a course of a state variable ($T^2$) of at least one (S1) of said manufacturing stations being determined point-by-point, wherein (a) a number of the products to be monitored is determined as a first type number (j), said type number being larger than 1;

(b) a technical product parameter (d1,d2,b1) which is influenced in said at least one manufacturing station (S1), is determined, and a measuring arrangement (10,11,12) is allocated to said manufacturing station, for measuring said technical product parameter for said products to be monitored after having been influenced in said manufacturing station (S1);

in said manufacturing process (c) a random sample of a first product modified in its physical state in said one manufacturing station (S1) is taken from said first type number of products, and measured values ($m_1$, $m_2$, $m_N$) are determined for said defined technical product parameter;

(d) an individual average value ($\overline{m}_p$), which is calculated from the measured values of said measuring arrangement, is calculated, and said average value ($\overline{m}_p$) is stored as a one-dimensional value in a multi-dimensional average value ($\overline{m}$) allocated to said first type number (j);

said stored multi-dimensional average value comprising several individual one-dimensional average values is converted together to a state value and stored or graphically represented (20) as a point ($T_a$,$T_b$,$T_c$) of the course of said state variable ($T^2(t)$).

15. Method according to claim 14, wherein said technical products are different or technically different products.

16. Method according to claim 15, wherein said monitored technical product parameter is substantially equal for different technical products.

17. Method according to claim 14, wherein said state value is calculated by a Hotelling's $T^2$ statistical analysis.

18. Method according to claim 14, wherein said at least said newly determined state value is stored and displayed (20).

19. Method according to claim 14, wherein said method steps (c) and (d) are effected for an equal technical product parameter of a further of said product types to be monitored, then storing the "individual average value" as a "further individual average value" at a different position of said multi-dimensional average value.

20. Method according to claim 14, wherein the number of said one-dimensional average values (scalars) in said multi-dimensional average value corresponds to at least said first type number (j).

21. Method according to claim 14, wherein said state value is converted already when not yet all one-dimensional values since a directly preceding conversion to a preceding state value have been renewed by updated measured values and their corresponding one-dimensional average values.

22. A method for monitoring quality of a plurality of different technical product types, including several sequentially arranged manufacturing stations, and whereby a state variable related to at least one of said manufacturing stations is determined point-by-point for a display, the method comprising:

determining as a first type number a number of product types to be monitored;

determining a technical product parameter which is affected in said at least one manufacturing station;

allocating a measuring arrangement to said at least one manufacturing station for measuring said technical product parameter for at least one of said monitored product types;

taking a random sample of a first product type whose physical state is modified in said at least one manufacturing station, said random sample being taken said first type number of product types;

determining measured values for said determined technical product parameter of said random sample;

calculating an individual average value from said measured values;

storing said individual average value in a multi-dimensional average value attributed to said first type number; and repeating said taking through said storing for a second product type to supplement a second measured average value to said multi-dimensional average value, wherein, after expiration of a defined time interval, said stored multi-dimensional average value which comprises several individual average values, is converted to a state variable for graphical display to represent one point of a course of said state variable.

23. A method for monitoring quality of a plurality of different technical product types which are produced in a quasi-parallel manufacturing process, said method including several sequentially arranged manufacturing stations, and whereby a course of a state variable for at least one of said manufacturing stations is determined point-by-point and displayed, the method comprising:

determining as a first type number a number of product types to be monitored;

determining a technical product parameter which is affected in said at least one manufacturing station;

allocating a measuring arrangement to said manufacturing station for measuring said technical product parameter for at least one of said monitored product types;

taking a random sample of a product type whose physical state is modified in said manufacturing station, said random sample being taken said first type number of product types;

determining measured values for said determined technical product parameter of said random sample;

calculating an individual average value from said measured values;

storing said individual average value in a multi-dimensional average value attributed to said first type number; and repeating said taking through said storing for at least one further product type to supplement at least one further measured average value to said multi-dimensional average value, wherein, after expiration of a defined time interval, said stored multi-dimensional average value which comprises several individual average values, is converted to a state variable and one of stored and graphically represented as a point of a course of said state variable.

* * * * *

UNITED STATES PATENT AND TRADEMARK OFFICE
CERTIFICATE OF CORRECTION

PATENT NO.    : 6,622,101 B1
DATED         : September 16, 2003
INVENTOR(S)   : R. Oechsner et al.

It is certified that error appears in the above-identified patent and that said Letters Patent is hereby corrected as shown below:

<u>Title page,</u>
Item [57], ABSTRACT,
Line 10, after "determining" insert -- a --.
Item [30], Foreign Application Priority Data,
"199 01 410" should be -- 199 01 410.8 --
"199 01 486" should be -- 199 01 486.8 —
"199 02 795" should be -- 199 02 795.1 --.
Item [73], Assignee, "AG." should be -- AG --.

<u>Column 14,</u>
Lines 26 and 31, "$(\underline{\frac{-}{m}})$" should be -- $(\underline{\frac{-}{m}})$ --

<u>Column 15,</u>
Lines 7 and 45, "$(\underline{\frac{-}{m}})$" should be -- $(\underline{\frac{-}{m}})$ --

Signed and Sealed this

Eleventh Day of May, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,622,101 B1
DATED : September 16, 2003
INVENTOR(S) : R. Oechsner et al.

It is certified that error appears in the above-identified patent and that said Letters Patent is hereby corrected as shown below:

Title page,
Item [75], Inventors, change "Poitr" to -- Piotr --
Item [73], Assignee, "AG." should be -- AG --.
Item [30], Foreign Application Priority Data,
"199 01 410" should be -- 199 01 410.8 --
"199 01 486" should be -- 199 01 486.8 --.
"199 02 795" should be -- 199 02 795.1 --.
Item [57], ABSTRACT,
Line 10, after "determining" insert -- a --.

Column 11,
Equation 3.1.1, should read -- $T^2 \quad N(\overline{m}-\overline{\overline{m}})^T S^{-1}(\overline{m}-\overline{\overline{m}})$ ---.

Column 14,
Lines 26 and 31, "$(\overline{m})$" should be -- $(\overline{\overline{m}})$ --

Column 15,
Lines 7 and 45, "$(\overline{m})$" should be -- $(\overline{\overline{m}})$ --

Signed and Sealed this

Seventh Day of September, 2004

JON W. DUDAS
*Director of the United States Patent and Trademark Office*